(12) United States Patent
Geprägs

(10) Patent No.: US 7,105,589 B2
(45) Date of Patent: Sep. 12, 2006

(54) FLAME-RESISTANT BLACK THERMOPLASTIC MOLDED MASSES

(75) Inventor: Michael Geprägs, Weisenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/512,383

(22) PCT Filed: Apr. 22, 2003

(86) PCT No.: PCT/EP03/04120

§ 371 (c)(1),
(2), (4) Date: Oct. 26, 2004

(87) PCT Pub. No.: WO03/091336

PCT Pub. Date: Nov. 6, 2003

(65) Prior Publication Data

US 2005/0250882 A1     Nov. 10, 2005

(30) Foreign Application Priority Data

Apr. 26, 2002 (DE) ................. 102 18 902

(51) Int. Cl.
*C08K 5/3432* (2006.01)
(52) U.S. Cl. .............. 524/90; 524/411; 524/412; 524/464; 524/465; 524/466; 524/467; 524/468; 524/469; 524/470; 524/471; 524/472

(58) Field of Classification Search ............. 524/90, 524/411–412, 464–472
See application file for complete search history.

(56) References Cited

U.S. PATENT DOCUMENTS

| | | | |
|---|---|---|---|
| 3,953,539 A | 4/1976 | Kawase et al. | 524/116 |
| 4,532,290 A | 7/1985 | Jaquiss et al. | 524/417 |
| 5,028,644 A | 7/1991 | Heinz et al. | 524/90 |
| 6,399,681 B1 | 6/2002 | Tsuruhara et al. | |

FOREIGN PATENT DOCUMENTS

| | | |
|---|---|---|
| DE | 199 04698 | 8/2000 |
| EP | 543128 | 5/1993 |

OTHER PUBLICATIONS

JP 60136753 Abst. XP-002249019.

*Primary Examiner*—Peter Szekely
(74) *Attorney, Agent, or Firm*—Novak Druce & Quigg, LLP; Jason D. Voight

(57) ABSTRACT

The invention relates to thermoplastic molded masses, comprising A) 10 to 97 wt. % of at least one thermoplastic polyester, B) 1 to 30 wt. % of a flame-resistant agent combination with, based on 100 wt. % B), b1) 20 to 99 wt. % of a halogenated flame resistant agent, b2) 1 to 80 wt. % of a antimony oxide, C) 0.01 to 3 wt. % of at least one polyamide, D) 0.01 to 2 wt. % of at least one nigrosin, E) 0.01 to 3 wt. % of at least one anti-dripping agent and F) 0 to 70 wt. % of further adjuncts, whereby the sum of components A) to F) is 100%.

11 Claims, No Drawings

FLAME-RESISTANT BLACK THERMOPLASTIC MOLDED MASSES

The invention relates to thermoplastic molding compositions comprising
A) from 10 to 97% by weight of at least one thermoplastic polyester,
B) from 1 to 30% by weight of a flame retardant combination made from, based on 100% by weight of B),
$b_1$) from 20 to 99% by weight of a halogen-containing flame retardant, and
$b_2$) from 1 to 80% by weight of an antimony oxide,
C) from 0.01 to 3% by weight of at least one polyamide,
D) from 0.01 to 2% by weight of at least one nigrosine,
E) from 0.01 to 3% by weight of an antidrip agent, and
F) from 0 to 70% by weight of other additives, where the total of the percentages by weight of the components A) to F) is 100%.

The invention further relates to the use of the molding compositions of the invention for producing fibers, films, or moldings of any type.

U.S. Pat. No. 4,532,290 and U.S. Pat. No. 3,953,539 disclose PC/polyester blends which comprise phosphates as inhibitors for transesterification or as color stabilizers.

EP-A 543 128 disclose blends of this type which may also comprise halogenated polycarbonates, with transesterification inhibitors based on zinc dihydrogenphosphate or on calcium dihydrogenphosphate ("acidic phosphates"). These can also be colored.

There continues to be a technical problem area in relation to the crystallization behavior and the flowability of molding compositions involving halogenated, in particular low-molecular-weight, poly- or oligocarbonates, which can be used as flame retardants for polyesters. The transesterification reaction between polycarbonate and polyester forms block copolymers which have broad molecular weight distribution and poorer crystallization behavior. This is seen in particular in the rapidly falling crystallization temperature, with a resultant negative effect on injection molding or blow molding.

Effects of this type are particular disadvantageous in the case of black-colored polyesters, since carbon black/nigrosine, and other organic black pigments, are not pH-neutral, and accelerate degradation of the polymer matrix during processing.

In particular in the case of thin-walled components, known fiber-reinforced black polyesters have inadequate surface gloss.

Due to low flowability, full reproduction of the structure of the mold surface is often impossible in the case of thin-walled components. Unevenness is produced on the surface of the component, and becomes apparent through reduced gloss. Furthermore, complete filling of the mold is not possible.

It is an object of the present invention, therefore, to provide black, flame-retardant polyester molding compositions which have improved processing performance, and preferably higher flowability. In particular, thin-walled moldings are to exhibit minimum unevenness of surface and good gloss. Flame retardancy properties are moreover not to be impaired.

We have found that this object is achieved by means of the molding compositions defined at the outset. Preferred embodiments are given in the subclaims.

Surprisingly, the combination of the mostly basic nigrosines with small amounts of a polyamide leads to good flame retardancy properties and good processing properties, and also to improved surface gloss.

As component (A), the molding compositions of the invention comprise from 10 to 97% by weight, preferably from 20 to 95% by weight, and in particular from 30 to 80% by weight, of a thermoplastic polyester.

Use is generally made of polyesters A) based on aromatic dicarboxylic acids and on an aliphatic or aromatic dihydroxy compound.

A first group of preferred polyesters is that of polyalkylene terephthalates, in particular those having from 2 to 10 carbon atoms in the alcohol moiety.

Polyalkylene terephthalates of this type are known per se and are described in the literature. Their main chain contains an aromatic ring which derives from the aromatic dicarboxylic acid. There may also be substitution in the aromatic ring, e.g. by halogen, such as chlorine or bromine, or by $C_1$–$C_4$-alkyl, such as methyl, ethyl, iso- or n-propyl, or n-, iso- or tert-butyl.

These polyalkylene terephthalates may be prepared by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise as other monomer units, up to 1% by weight, preferably up to 0.75% by weight, of 1,6-hexanediol and/or 2-methyl-1,5-pentanediol.

The viscosity number of the polyesters (A) is generally in the range from 50 to 220, preferably from 80 to 160 (measured in 0.5% strength by weight solution in a phenol/o-dichlorobenzene mixture (in a weight ratio of 1:1) at 25° C. in accordance with ISO 1628.

Particular preference is given to polyesters whose carboxyl end group content is up to 100 mval/kg of polyester, preferably up to 50 mval/kg of polyester and in particular up to 40 mval/kg of polyester. Polyesters of this type may be prepared, for example, by the process of DE-A 44 01 055. The carboxyl end group content is usually determined by titration methods (e.g. potentiometry).

Particularly preferred molding compositions comprise, as component A), a mixture of polyesters other than PBT, for example polyethylene terephthalate (PET). The proportion of the polyethylene terephthalate in the mixture is, for example, preferably up to 50% by weight, in particular from 10 to 35% by weight, based on 100% by weight of A).

It is also advantageous, where appropriate, to use recycled PET materials (also termed scrap PET) in a mixture with polyalkylene terephthalates, such as PBT.

Recycled materials are generally:
1) those known as post-industrial recycled materials: these are production wastes during polycondensation or during processing, e.g. sprues from injection molding, start-up material from injection molding or extrusion, or edge trims from extruded sheets or films.
2) Post-consumer recycled materials: these are plastic items which are collected and treated after utilization by the end consumer. Blow-molded PET bottles for mineral water, soft drinks and juices are easily the predominant items in terms of quantity.

Both types of recycled material may be used either as regrind or in the form of pellets. In the latter case, the crude recycled materials are isolated and purified and then melted and pelletized using an extruder. This usually facilitates handling and free-flowing properties, and metering for further steps in processing.

The recycled materials used may either be pelletized or in the form of regrind. The edge length should not be more than 6 mm and should preferably be less than 5 mm.

Because polyesters undergo hydrolytic cleavage during processing (due to traces of moisture) it is advisable to predry the recycled material. The residual moisture after drying is preferably <0.2%, in particular <0.05%.

Another class to be mentioned is that of fully aromatic polyesters deriving from aromatic dicarboxylic acids and aromatic dihydroxy compounds.

Suitable aromatic dicarboxylic acids are the compounds previously described for the polyalkylene terephthalates. The mixtures preferably used are made from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the formula

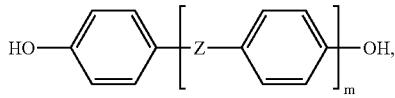

where Z is alkylene or cycloalkylene having up to 8 carbon atoms, arylene having up to 12 carbon atoms, carbonyl, sulfonyl, oxygen or sulfur or a chemical bond, and where m is from 0 to 2. The phenylene groups in the compounds may also have substitution by $C_1$–$C_6$-alkyl or alkoxy and fluorine, chlorine or bromine.

Examples of parent compounds for these compounds are dihydroxydiphenyl,
di(hydroxyphenyl)alkane,
di(hydroxyphenyl)cycloalkane,
di(hydroxyphenyl) sulfide,
di(hydroxyphenyl) ether,
di(hydroxyphenyl) ketone,
di(hydroxyphenyl) sulfoxide,
α,α'-di(hydroxyphenyl)dialkylbenzene,
di(hydroxyphenyl) sulfone, di(hydroxybenzoyl)benzene resorcinol, and
hydroquinone, and also the ring-alkylated and ring-halogenated derivatives of these.

Among these, preference is given to
4,4'-dihydroxydiphenyl,
2,4-di(4'-hydroxyphenyl)-2-methylbutane
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane, and in particular to
2,2-di(4'-hydroxyphenyl)propane
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane or mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

According to the invention, halogen-free polycarbonates are also polyesters. Examples of suitable halogen-free polycarbonates are those based on diphenols of the formula

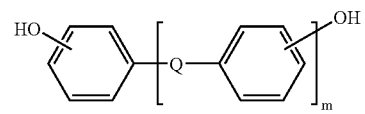

where Q is a single bond, $C_1$–$C_8$-alkylene, $C_2$–$C_3$-alkylidene, $C_3$–$C_6$-cycloalkylidene, $C_6$–$C_{12}$-arylene or else —O—, —S— or —SO$_2$—, and m is an integer from 0 to 2. The phenylene radicals of the biphenols may also have substituents, such as $C_1$–$C_6$-alkyl or $C_1$–$C_6$-alkoxy.

Examples of preferred biphenols of this formula are hydroquinone, resorcinol, 4,4'-dihydroxydiphenyl, 2,2-bis(4-hydroxyphenyl)-propane, 2,4-bis(4-hydroxyphenyl)-2-methylbutane and 1,1-bis(4-hydroxyphenyl)cyclohexane. Particular preference is given to 2,2-bis(4-hydroxyphenyl)propane and 1,1-bis(4-hydroxy-henyl)cyclohexane, and also to 1,1-bis(4-hydroxyphenyl)-3,3,5-trimethylcyclohexane.

Either homopolycarbonates or copolycarbonates are suitable as component A, and preference is given to the copolycarbonates of bisphenol A, as well as to bisphenol A homopolymer.

Suitable polycarbonates may be branched in a known manner, specifically and preferably by incorporating from 0.05 to 2.0 mol %, based on the total of the biphenols used, of at least trifunctional compounds, for example those having three or more phenolic OH groups.

Polycarbonates which have proven particularly suitable have relative viscosities $\eta_{rel}$ of from 1.10 to 1.50, in particular from 1.25 to 1.40. This corresponds to an average molar mass $M_w$ (weight average) of from 10 000 to 200 000 g/mol, preferably from 20 000 to 80 000 g/mol.

The biphenols of this formula are known per se or can be prepared by known processes.

The polycarbonates may, for example, be prepared by reacting the biphenols with phosgene in the interfacial process, or with phosgene in the homogeneous-phase process (known as the pyridine process), and in each case the desired molecular weight may be achieved in a known manner by using an appropriate amount of known chain terminators. (In relation to polydiorganosiloxane-containing polycarbonates see, for example, DE-A 33 34 782).

Examples of suitable chain terminators are phenol, p-tert-butylphenol, or else long-chain alkylphenols, such as 4-(1,3-tetramethylbutyl)phenol, as in DE-A 28 42 005, or monoalkylphenols, or dialkylphenols with a total of from 8 to 20 carbon atoms in the alkyl substituents, as in DE-A 35 06 472, such as p-nonylphenol, 3,5-di-tert-butylphenol, p-tert-octylphenol, p-dodecylphenol, 2-(3,5-dimethylheptyl)phenol and 4-(3,5-dimethylheptyl)phenol.

For the purposes of the present invention, halogen-free polycarbonates are polycarbonates made from halogen-free biphenols, from halogen-free chain terminators and, where appropriate, from halogen-free branching agents, where the content of subordinate amounts at the ppm level of hydrolyzable chlorine, resulting, for example, from the preparation of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention.

Other suitable components A) which may be mentioned are amorphous polyester carbonates, where phosgene has been replaced, during the preparation, by aromatic dicarboxylic acid units, such as isophthalic acid and/or terephthalic acid units. For further details reference may be made at this point to EP-A 711 810.

Other suitable copolycarbonates with cycloalkyl radicals as monomer units have been described in EP-A 365 916.

It is also possible to replace bisphenol A with bisphenol TMC. Polycarbonates of this type are commercially available from Bayer with the trademark APEC HT®.

As component B), the molding compositions of the invention comprise from 1 to 30% by weight, preferably from 2 to 25% by weight, and in particular from 5 to 20% by weight, of a flame retardant combination made from $b_1$) from 20 to 99% by weight, preferably from 50 to 85% by weight, of a halogen-containing flame retardant, preferably with a degree of polymerization or degree of oligomerization >3, preferably >4, and $b_2$) from 1 to 80% by weight, preferably from 15 to 50% by weight, of an antimony oxide.

Preferred oxides $b_2$) are antimony trioxide and antimony pentoxide. To improve dispersion, the oxide $b_2$) may be incorporated into the polymer A) in what are known as masterbatches (concentrates), and the thermoplastics used in the concentrate may, for example, be the same as component A) or differ from the component A) used. Preference is given to concentrates of $b_2$) in polyolefins, preferably polyethylene.

Suitable flame retardants $b_1$) are preferably brominated compounds, such as brominated oligocarbonates (BC 52 or BC 58 from Great Lakes or FG 7000 from Teijin Chem.) of the structural formula:

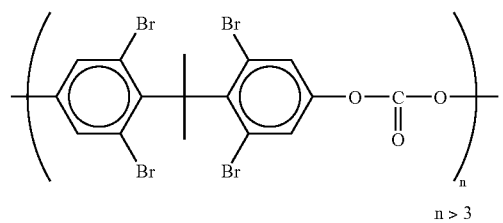

Other suitable compounds are polypentabromobenzyl acrylates where n>4 (e.g. FR 1025 from Dead Sea Bromine (DSB)) of the formula:

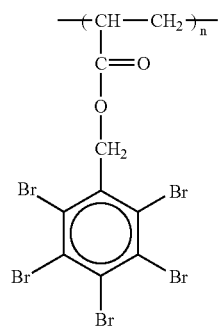

Other preferred brominated compounds are oligomeric reaction products (n>3) made from tetrabromobisphenol A with epoxides (e.g. FR 2300 and 2400 from DSB) of the formula:

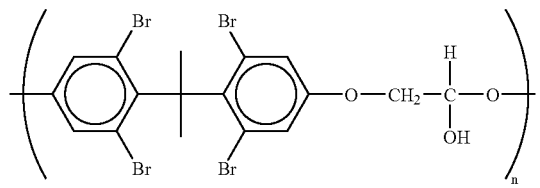

The brominated oligostyrenes preferably used as flame retardants have an average degree of polymerization (number average) of from 4 to 90, preferably from 5 to 60, measured by vapor-pressure osmometry in toluene. Cyclic oligomers are likewise suitable. In a preferred embodiment of the invention, the brominated oligomeric styrenes to be used have the formula I below, where R is hydrogen or an aliphatic radical, in particular alkyl, e.g. $CH_3$ or $C_2H_5$, and n is the number of repeating building blocks in the chain. $R^1$ may be either H or bromine, or else a fragment of a conventional free-radical generator:

(I)

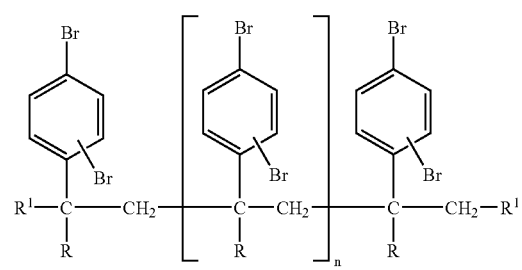

n may be from 4 to 88, preferably from 4 to 58. The brominated oligostyrenes contain from 40 to 80% by weight, preferably from 55 to 70% by weight, of bromine. Preference is given to a product which is composed predominantly of polydibromostyrene. The substances can be melted without decomposition and are soluble in, for example, tetrahydrofuran. They may be prepared either by ring-bromination of—where appropriate aliphatically hydrogenated—styrene oligomers, as obtained, for example, by thermal polymerization of styrene (according to DT-A 25 37 385) or by free-radical oligomerization of suitable brominated styrenes. The flame retardant may also be prepared by ionic oligomerization of styrene followed by bromination. The amount of brominated oligostyrene needed to provide flame retardancy to the polyesters depends on the bromine content. The bromine content in the molding compositions of the invention is from 2 to 20% by weight, preferably from 5 to 12% by weight.

The brominated polystyrenes according to the invention are usually obtained from the process described in EP-A 47 549:

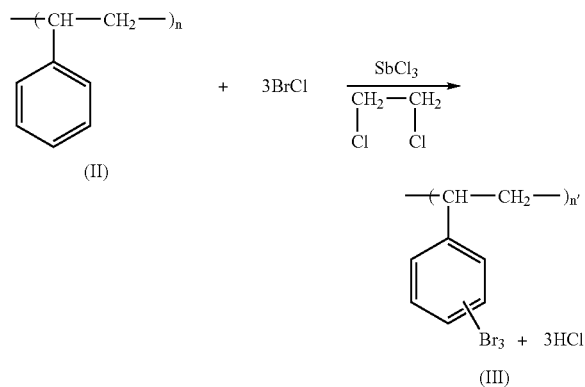

The brominated polystyrenes obtained from this process and available commercially are predominantly ring-substituted tribrominated products. n' (see III) is generally from 120 to 2000, corresponding to a molecular weight of from 40 000 to 1 000 000, preferably from 130 000 to 800 000.

The bromine content (based on the content of ring-substituted bromine) is generally at least 55% by weight, preferably at least 60% by weight and in particular 68% by weight.

The pulverulent products available commercially generally have a glass transition temperature of from 160 to 200° C., and are obtainable, for example, as HP 7010 from Albemarle and Pyrocheck® PB 68 from Ferro Corporation or Saytex 7010 from Albemarle.

It is also possible to use mixtures of the brominated oligostyrenes with brominated polystyrenes in the molding compositions of the invention and the mixing ratio may be as desired.

The degree of polymerization n may usually be determined by determining the molecular weight.

It corresponds to a molecular weight ($M_n$)>2000, and this can generally be determined by membrane osmometry or by light scattering for $M_w$>10 000.

Chlorine-containing flame retardants $b_1$) are also suitable, preference being given to Dechlorane® plus from the company Oxychem.

As component C), the molding compositions of the invention comprise at least one polyamide C) in amounts of from 0.01 to 3% by weight, preferably from 0.1 to 2% by weight, and in particular from 0.6 to 0.9% by weight.

Suitable polyamides are any of those of aliphatic semicrystalline, or semiaromatic, or amorphous structure, and blends of these, including the polyetheramides, such as polyether-block-amides. For the purposes of the present invention, polyamides are any known polyamide.

These polyamides generally have a viscosity number of from 90 to 350 ml/g, preferably from 110 to 240 ml/g, determined in a 0.5% strength by weight solution in 96% strength by weight sulfuric acid at 25° C. to ISO 307.

Preference is given to semicrystalline or amorphous resins with molecular weight (weight-average) of at least 5000, e.g. as described in U.S. Pat. Nos. 2,071,250, 2,071,251, 2,130,523, 2,130,948, 2,241,322, 2,312,966, 2,512,606, and 3,393,210. Examples of these are polyamides derived from lactams having from 7 to 13 ring members, for example polycaprolactam, polycaprylolactam, and polylaurolactam, and also polyamides obtained by reacting dicarboxylic acids with diamines.

Dicarboxylic acids which may be used are alkanedicarboxylic acids aving from 6 to 12 carbon atoms, in particular from 6 to 10 carbon atoms, and aromatic dicarboxylic acids. Acids which may be mentioned here are adipic acid, azelaic acid, sebacic acid, odecanedioic acid (=decanedicarboxylic acid), and terephthalic and/or isophthalic acid.

Particularly suitable diamines are alkanediamines having from 6 to 12 carbon atoms, in particular from 6 to 8 carbon atoms, and also m-xylylenediamine, di(4-aminophenyl) methane, di(4-aminocyclohexyl)methane, 2,2-di(4-aminophenyl)propane, or 2,2-di(4-aminocyclohexyl)propane.

Preferred polyamides are aliphatic polyamides, e.g. polyhexamethyleneadipamide (PA 66) and polyhexamethylenesebacamide (PA 610), polycaprolactam (PA 6), and also in particular nylon-6/6,6 copolyamides, preferably with from 5 to 95% content of caprolactam units, in particular from 5 to 20% by weight of caprolactam units.

Mention may also be made of polyamides obtainable, for example, by condensing 1,4-diaminobutane with adipic acid at an elevated temperature (nylon-4,6). Examples of preparation processes for polyamides of this structure are described in EP-A 38 094, EP-A 38 582, and EP-A 39 524.

Other examples are polyamides obtainable by copolymerizing two or more of the abovementioned monomers, and mixtures of two or more polyamides in any desired mixing ratio.

Such semiaromatic copolyamides as PA 6/6T and PA 66/6T have also proven particularly advantageous with triamine content of less than 0.5% by weight, preferably less than 0.3% by weight (see EP-A 299 444). The semiaromatic copolyamides with low triamine content may be prepared by the processes described in EP-A 129 195 and 129 196.

The following list, which is not comprehensive, includes the polyamides mentioned and others for the purposes of the present invention (the monomers being given in brackets):
PA 46 (tetramethylenediamine, adipic acid)
PA 66 (hexamethylenediamine, adipic acid)
PA 69 (hexamethylenediamine, azelaic acid)
PA 610 (hexamethylenediamine, sebacic acid)
PA 612 (hexamethylenediamine, decanedicarboxylic acid)
PA 613 (hexamethylenediamine, undecanedicarboxylic acid)
PA 1212 (1,12-dodecanediamine, decanedicarboxylic acid)
PA 1313 (1,13-diaminotridecane, undecanedicarboxylic acid)
PA MXD6 (m-xylylenediamine, adipic acid)

PA TMDT (trimethylhexamethylenediamine, terephthalic acid)
PA 4 (pyrrolidone)
PA 6 (ε-caprolactam)
PA 7 (enantholactam)
PA 8 (caprylolactam)
PA 9 (9-aminopelargonic acid)
PA 11 (11-aminoundecanoic acid)
PA 12 (laurolactam)

These polyamides and their preparation are known. The skilled worker will find details of their preparation in Ullmanns Encyklopäadie der Technischen Chemie, 4th edition, Vol. 19, pp. 39–54, Verlag Chemie, Weinheim 1980, and also Ullmanns Encyclopedia of Industrial Chemistry, Vol. A21, pp. 179–206, VCH Verlag, Weinheim 1992, and also Stoeckhert, Kunststofflexikon, 8th edition, pp. 425–428, Hanser Verlag Munich 1992 (keyword "Polyamides" et seq.).

Brief details will be given below of the preparation of the preferred polyamides PA 6, PA 66, and the nylon-6/6,6 copolyamides.

The starting monomers are preferably polymerized or polycondensed by the usual processes. For example, caprolactam may be polymerized by the continuous processes described in DE-A 14 95 198 and DE-A 25 58 480. The polymerization of AH salt to prepare PA 66 may proceed by the conventional batch process (see: Polymerization Processes pp. 424–467, in particular pp. 444–446, Interscience, New York, 1977), or by a continuous process, e.g. as in EP-A 129 196.

Concomitant use may be made of conventional chain regulators in the polymerization. Examples of suitable chain regulators are triacetonediamine compounds (see WO-A 95/28443), monocarboxylic acids, such as acetic acid, propionic acid, and benzoic acid, and also bases, such as hexamethylenediamine, benzylamine, and 1,4-cyclohexanediamine. Other suitable chain regulators are $C_4$–$C_{10}$ dicarboxylic acids, such as adipic acid, azelaic acid, sebacic acid, dodecanedioic acid; $C_5$–$C_8$ cycloalkanedicarboxylic acids, such as cyclohexane-1,4-dicarboxylic acid; benzene- and naphthalenedicarboxylic acids, such as isophthalic acid, terephthalic acid, and naphthalene-2,6-dicarboxylic acid.

The resultant polymer melt is discharged from the reactor, cooled, and pelletized. The resultant pellets are subjected to post-polymerization. This takes place in a manner known per se by heating the pellets to the temperature T below the melting point $T_m$ or crystallite melting point $T_c$ of the polyamide. The post-polymerization sets the final molecular weight of the polyamide (measurable as viscosity number VN, see VN data above). The post-polymerization usually takes from 2 to 24 hours, in particular from 12 to 24 hours. Once the desired molecular weight has been achieved the pellets are cooled in the usual way.

Appropriate polyamides are obtainable with the trade name Ultramid® from BASF AG.

As component D), the molding compositions of the invention comprise from 0.01 to 2% by weight, preferably from 0.1 to 1% by weight, and in particular from 0.4 to 0.6% by weight, of at least one nigrosine.

Nigrosines are generally understood to be a group of black or gray phenazine dyes (azine dyes) related to the indolines and having various embodiments (water-soluble, fat-soluble, petroleum-soluble) used in wool dyeing, wool printing, blackening of soaps, dyeing of leather, of shoe creams, of varnishes, of plastics, of stoving lacquers, and of inks and the like, and also as microscopy dyes. Nigrosines are obtained industrially by heating nitrobenzene, aniline, and aniline hydrochloride with metallic iron and $FeCl_3$. (See ref.: Beilstein E II 12,77, Kirk-Othmer (3.) 3,378–382).

Phenazine dyes generally contain dibenzopyrazine as parent structure for this class of dye:

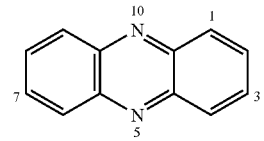

$C_{12}H_8N_2$, MW 180.20. Yellow needles, melting point 171°, sublimes, boiling point above 360°, insoluble in water, moderately soluble in alcohol, ether, benzene.

Examples of suitable nigrosines are available commercially with the trade name Farbbase SAPL from the company Bayer AG.

The molding compositions of the invention comprise from 0.01 to 3% by weight, preferably from 0.05 to 2% by weight, and in particular from 0.1 to 1% by weight, of an antidrip agent E), such as fluorinated ethylene polymers. These are polymers of ethylene with fluorine content of from 55 to 76% by weight, preferably from 70 to 76% by weight.

Examples of these are polytetrafluoroethylene (PTFE), tetrafluoroethylene-hexafluoropropylene copolymers, and tetrafluoroethylene copolymers with relatively small proportions (generally up to 50% by weight) of copolymerizable ethylenically unsaturated monomers. An example of a description of these is found in Schildknecht in "Vinyl and Related Polymers", Wiley-Verlag, 1952, pp 484 to 494 and by Wall in "Fluorpolymers" (Wiley Interscience, 1972).

These fluorinated ethylene polymers have homogeneous distribution in the molding compositions and preferably have a numeric median particle size $d_{50}$ in the range from 0.05 to 10 μm, in particular from 0.1 to 5 μm. These small particle sizes may particularly preferably be achieved by using aqueous dispersions of fluorinated ethylene polymers and incorporating these into a polyester melt.

The fluorinated ethylene polymers may moreover be in the form of a masterbatch (e.g. up to 5% by weight in PBT). Another preferred form is PTFE (powder or compactate) encapsulated by styrene-acrylonitrile copolymers, in particular by PSAN, this form of PTFE permitting very fine distribution of the fluorinated ethylene polymers. An example of this product is marketed with the name Blendexe® 449 by GE Specialty Chemicals.

As component F), the molding compositions of the invention may comprise from 0 to 70% by weight, in particular up to 50% by weight, of other additives.

As component F), the molding compositions of the invention may comprise from 0 to 5% by weight, in particular from 0.01 to 5% by weight, preferably from 0.05 to 3% by weight, and in particular from 0.1 to 2% by weight, of at least one ester or amide of saturated or unsaturated aliphatic carboxylic acids having from 10 to 40 carbon atoms, preferably from 16 to 22 carbon atoms with saturated aliphatic alcohols or amines having from 2 to 40 carbon atoms, preferably from 2 to 6 carbon atoms.

The carboxylic acids may be monobasic or dibasic. Examples which may be mentioned are perlargonic acid, palmitic acid, lauric acid, margaric acid, dodecanedioic acid, behenic acid, and particularly preferably stearic acid, capric acid, and montanic acid (a mixture of fatty acids having from 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol, pentaerythritol, prereference being given to glycerol and pentaerythritol.

The aliphatic amines may be mono- to tribasic. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use combinations of various esters or amides, or esters with amides, in any desired mixing ratio. A particularly advantageous method is addition of this component F) in amounts of from 0.1 to 0.8% by weight, in particular from 0.5 to 0.7% by weight, based on A) on achieving at least 80% of the desired final viscosity of component A), and then compounding with the other components B) to F).

Examples of other additives F) are amounts of up to 40% by weight, preferably up to 30% by weight, of elastomeric polymers (often also termed impact modifiers, elastomers, or rubbers).

These are very generally copolymers which have preferably been built up from at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, Germany, 1961), pages 392–406, and in the monograph by C. B. Bucknall, "Toughened Plastics" (Applied Science Publishers, London, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, hereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, or mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also include dicarboxylic acids, such as maleic acid and fumaric acid, or derivatives of these acids, e.g. esters and anhydrides, and/or monomers containing epoxy groups. These monomers containing dicarboxylic acid derivatives or containing epoxy groups are preferably incorporated into the rubber by addition to the monomer mixture of monomers containing dicarboxylic acid groups and/or epoxy groups and having the formula I, II, III or IV

(I)

$$R^1C(COOR^2)\!=\!\!=\!C(COOR^3)R^4$$

(II)

$$\begin{matrix} R^1 & & R^4 \\ \diagdown & & \diagup \\ C & =\!\!=\!\!= & C \\ | & & | \\ CO & & CO \\ & \diagdown_{O}\diagup & \end{matrix}$$

(III)

$$CHR^7\!=\!CH\!-\!(CH_2)_m\!-\!O\!-\!(CHR^6)_g\!-\!\overset{O}{\overset{\diagup\diagdown}{CH\!-\!CHR^5}}$$

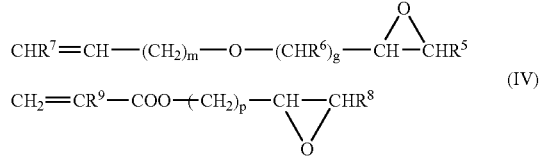

(IV)

$$CH_2\!=\!CR^9\!-\!COO\!-\!\!\!\!(CH_2)_p\!-\!\underset{O}{\overset{}{CH\!-\!CHR^8}}$$

where $R^1$ to $R^9$ are hydrogen or alkyl having from 1 to 6 carbon atoms, and m is an integer from 0 to 20, g is an integer from 0 to 10 and p is an integer from 0 to 5.

$R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates containing epoxy groups, such as glycidyl acrylate and glycidyl methacrylate, and the esters with tertiary alcohols, such as tert-butyl acrylate. Although the latter have no free carboxyl groups their behavior approximates to that of the free acids and they are therefore termed monomers with latent carboxyl groups.

The copolymers are advantageously composed of from 50 to 98% by weight of ethylene, from 0.1 to 20% by weight of monomers containing epoxy groups and/or methacrylic acid and/or monomers containing anhydride groups, the remaining amount being (meth)acrylates.

Particular preference is given to copolymers made from
from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid and/or maleic anhydride, and
from 1 to 45% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may be used are vinyl esters and vinyl ethers.

The ethylene copolymers described above may be prepared by processes known per se, preferably by random copolymerization at high pressure and elevated temperature. Appropriate processes are well known.

Preferred elastomers also include emulsion polymers whose preparation is described, for example, by Blackley in the monograph "Emulsion Polymerization". The emulsifiers and catalysts which may be used are known per se.

In principle it is possible to use homogeneously structured elastomers or those with a shell construction. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, and corresponding methacrylates, and butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell made from a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxyl, latent carboxyl, amino and amide groups, and also functional groups which may be introduced by concomitant use of monomers of the formula

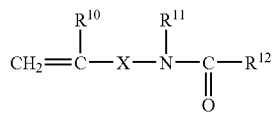

where:
$R^{10}$ is hydrogen or $C_1$–$C_4$-alkyl,
$R^{11}$ is hydrogen, $C_1$–$C_8$-alkyl or aryl, in particular phenyl,
$R^{12}$ is hydrogen, $C_1$–$C_{10}$-alkyl, $C_6$–$C_{12}$-aryl or —$OR^{13}$,
$R^{13}$ is $C_1$–$C_8$-alkyl or $C_6$–$C_{12}$-aryl, where appropriate with substitution by O— or N-containing groups,
X is a chemical bond, $C_1$–$C_{10}$-alkylene or $C_6$–$C_{12}$-arylene, or

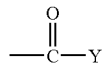

Y is O-Z or NH-Z, and
Z is $C_1$–$C_{10}$-alkylene or $C_6$–$C_{12}$-arylene.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP A 50 265.

It is also possible to use the monomers known as graft-linking monomers, i.e. monomers having two or more polymerizable double bonds which react at different rates during the polymerization.

Preference is given to the use of those compounds in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers containing allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Instead of graft polymers whose structure has more than one shell it is also possible to use homogeneous, i.e. single-shell, elastomers made from 1,3-butadiene, isoprene and n-butyl acrylate or from copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core made from n-butyl acrylate or based on butadiene and with an outer envelope made from the abovementioned copolymers, and copolymers of ethylene with comonomers which supply reactive groups.

The elastomers described may also be prepared by other conventional processes, e.g. by suspension polymerization.

Silicone rubbers, as described in DE-A 37 25 576, EP-A 235 690, DE-A 38 00 603 and EP-A 319 290, are likewise preferred.

It is, of course, also possible to use mixtures of the abovementioned rubber types.

Fibrous or particulate fillers F) which may be mentioned are carbon fibers, glass fibers, glass beads, amorphous silica, asbestos, calcium silicate, calcium metasilicate, magnesium carbonate, kaolin, chalk, powdered quartz, mica, barium sulfate and feldspar, used in amounts of up to 50% by weight, in particular from 1 to 50% by weight, preferably from 5 to 40% by weight, and in particular from 15 to 35% by weight.

Preferred fibrous fillers which may be mentioned are carbon fibers, aramide fibers and potassium titanate fibers, and particular preference is given to glass fibers in the form of E glass. These may be used as rovings or in the commercially available forms of chopped glass.

The fibrous fillers may have been surface-pretreated with a silane compound to improve compatibility with the thermoplastic.

Suitable silane compounds have the formula:

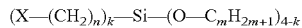

where:

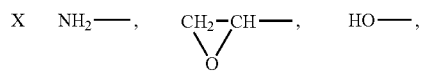

n is an integer from 2 to 10, preferably 3 or 4,
m is an integer from 1 to 5, preferably 1 or 2, and
k is an integer from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which contain a glycidyl group as substituent X.

The silane compounds are generally used for surface coating in amounts of from 0.05 to 5% by weight, preferably from 0.5 to 1.5% by weight and in particular from 0.8 to 1% by weight (based on E).

Acicular mineral fillers are also suitable.

For the purposes of the present invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may, where appropriate, have been pretreated with the abovementioned silane compounds, but the pretreatment is not essential.

Other fillers which may be mentioned are kaolin, calcined kaolin, wollastonite, talc, and chalk.

As component F), the thermoplastic molding compositions of the invention may comprise conventional processing aids, such as stabilizers, oxidation retarders, agents to counteract decomposition by heat and decomposition by ultraviolet light, other lubricants and release agents, colorants, such as dyes and pigments, nucleating agents, plasticizers, etc.

UV stabilizers are generally used in amounts of up to 2% by weight, based on the molding composition, and those which may be mentioned are various substituted resorcinols, salicylates, benzotriazoles, and benzophenones.

Preferred suitable stabilizers are organic phosphonites F) of the formula I

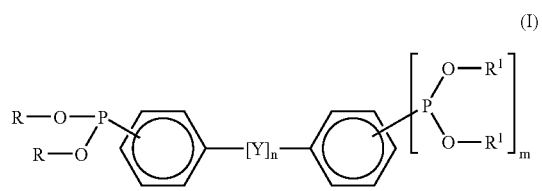

where
m is 0 or 1,
n is 0 or 1,
y is an oxygen bridge, a sulfur bridge, or a 1,4-phenylene bridge, or a bridging unit of formula —CH($R^2$)—; all of the R—O— and $R^1$—O-groups are independent of one another and are the radical of an aliphatic, alicyclic or aromatic alcohol which may contain up to three hydroxyl groups, excluding any arrangement of the hydroxyl groups which permits these to be parts of a phosphorus-containing ring (termed monovalent R—O-groups), or two R—O— or, respectively, $R^1$—O-groups, bonded to a phosphorus atom, in each case independently of one another, together are the radical of an aliphatic, alicyclic or aromatic alcohol having a total of up to three hydroxyl groups (termed divalent R—O— or, respectively, $R^1$—O-groups), $R^2$ is hydrogen, $C_1$–$C_8$-alkyl or a group of the formula $COOR^3$, and $R^3$ is $C_1$–$C_8$-alkyl.

It is preferable for at least one R—O and at least one $R^1$—O-group to be a phenol radical which carries a sterically hindered group, in particular tert-butyl, in the 2-position.

Particular preference is given to tetrakis-(2,4-di-tert-butylphenyl) biphenylenediphosphonite, which is available commercially from Ciba Geigy AG as Irgaphos® PEPQ.

If R—O— and $R^1$—O— are bivalent radicals, they preferably derive from di- or trihydric alcohols.

R preferably has the same meaning as $R^1$, and this is alkyl, aralkyl (preferably substituted or unsubstituted phenyl or phenylene), aryl (preferably substituted or unsubstituted phenyl) or a group of the formula α

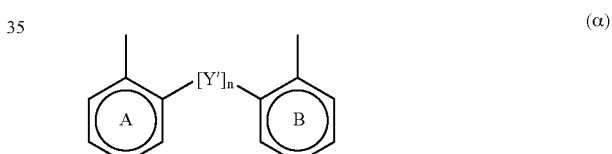

where the rings A and B may carry other substituents and Y' is an oxygen bridge or a sulfur bridge or a bridging unit of the formula —CH($R^3$)—, $R^2$ is hydrogen, $C_1$–$C_8$-alkyl or a group of the formula —$COOR^3$, and $R^3$ is $C_1$–$C_8$-alkyl, and n is 0 or 1 (termed bivalent R').

Particularly preferred radicals R are the radicals R", where this is $C_1$–$C_{22}$-alkyl, phenyl, which may carry from 1 to 3 substituents selected from the class consisting of cyano-$C_1$–$C_{22}$-alkyl, $C_1$–$C_{22}$-alkoxy, benzyl, phenyl, 2,2,6,6-tetramethylpiperidyl-4-, hydroxyl, $C_1$–$C_8$-alkylphenyl, carboxyl, —C($CH_3$)$_2$—$C_6H_5$, —COO—$C_1$–$C_{22}$-alkyl, —$CH_2CH_2$—COOH, —$CH_2CH_2$COO—, $C_1$–$C_{22}$-alkyl or —$CH_2$—S—$C_1$–$C_{22}$-alkyl; or a group of the formulae i to vii.

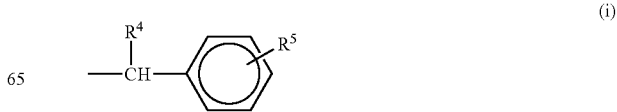

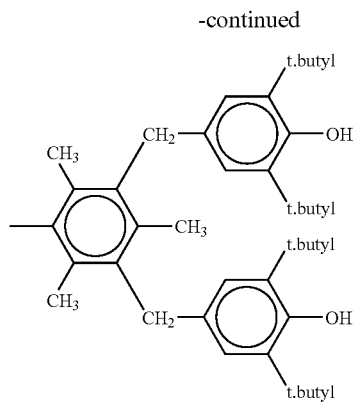

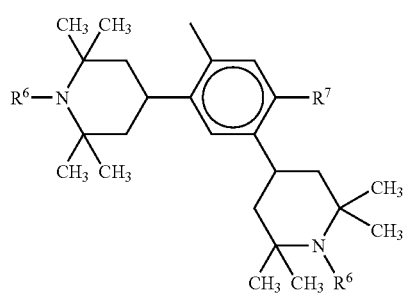

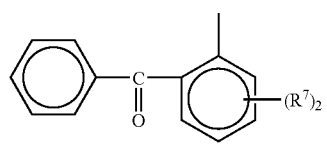

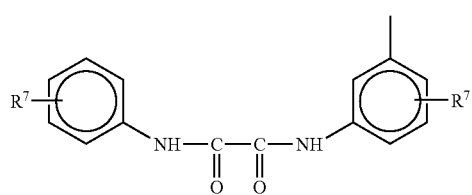

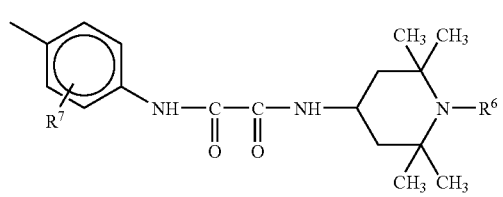

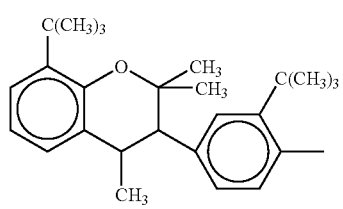

or two groups R″ together are a group of the formula viii

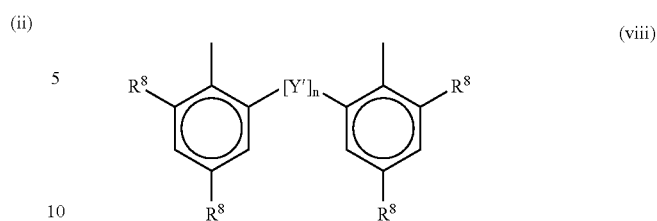

where
R⁸ is hydrogen or $C_1$–$C_{22}$-alkyl,
R⁶ is hydrogen, $C_1$–$C_4$-alkyl or —CO—$C_1$–$C_8$-alkyl,
R⁴ is hydrogen or $C_1$–$C_{22}$-alkyl,
R⁵ is hydrogen, $C_1$–$C_{22}$-alkyl, $C_1$–$C_{22}$-alkoxy, benzyl, cyano, phenyl, hydroxyl, $C_1$–$C_8$-alkylphenyl, $C_1$–$C_{22}$-alkoxycarbonyl, $C_1$–$C_{22}$-alkoxycarbonylethyl, carboxyethyl, 2,2,6,6-tetramethylpiperidyl-4-, or a group of the formula —$CH_2$—S—$C_1$–$C_{22}$-alkyl or —$C(CH_3)_2$—$C_6H_5$ and
R⁷ is hydrogen, $C_1$–$C_{22}$-alkyl, hydroxyl or alkoxy, and
Y′ and n are as defined above.

Particularly preferred radicals R are those radicals R″ which have one of the formulae a to g

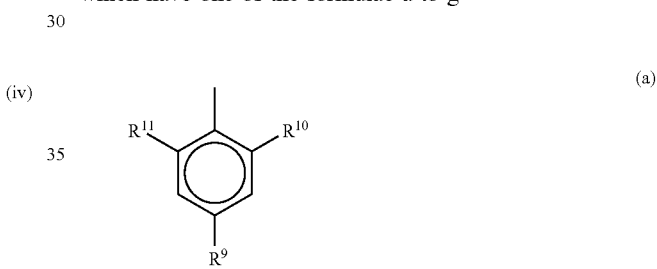

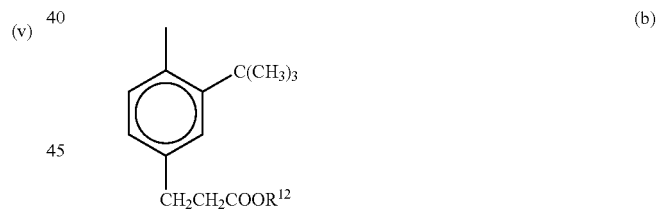

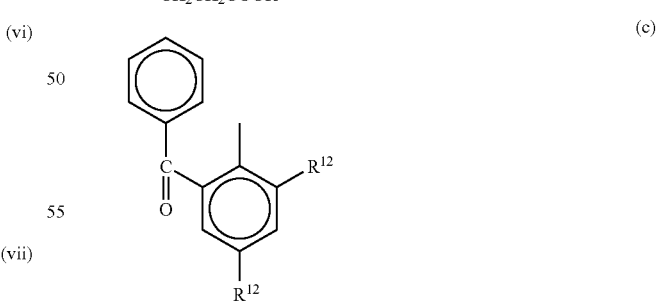

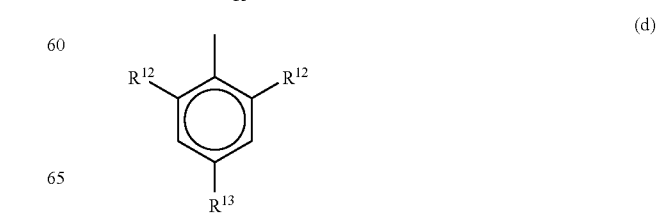

-continued

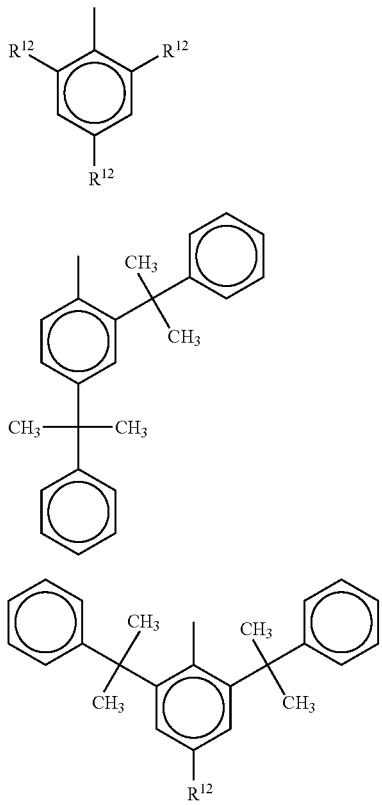

where
R$^9$ is hydrogen, C$_1$–C$_8$-alkyl, C$_1$–C$_8$-alkoxy, phenyl, C$_1$–C$_8$-alkylphenyl or phenyl-C$_1$–C$_8$-alkylphenyl or phenyl-C$_1$–C$_4$-alkyl,
R$^{10}$ and R$^{11}$, independently of one another, are hydrogen, C$_1$–C$_{22}$-alkyl, phenyl or C$_1$–C$_8$-alkylphenyl,
R$^{12}$ is hydrogen or C$_1$–C$_8$-alkyl, and
R$^{13}$ is cyano, carboxyl or C$_1$–C$_8$-alkoxycarbonyl.

Among groups of the formula a, preference is given to 2-tert-butylphenyl, 2-phenylphenyl, 2-(1',1'-dimethypropyl)phenyl, 2-cyclohexylphenyl, 2-tert-butyl-4-methylphenyl, 2,4-di-tert-amylphenyl, 2,4-di-tert-butylphenyl, 2,4-diphenylphenyl, 2,4-di-tert-octylphenyl, 2-tert-butyl-4-phenylphenyl, 2,4-bis(1',1'-dimethylpropyl)phenyl, 2-(1'-phenyl-1'-methylethyl)phenyl, 2,4-bis(1'-phenyl-1'-methylethyl)phenyl and 2,4-di-tert-butyl-6-methylphenyl.

Processes for preparing the phosphonites F) may be found in DE-A 40 01 397 and these may be present in the molding compositions in amounts of from 0.001 to 5% by weight, preferably from 0.01 to 3% by weight. Other phosphorus-containing stabilizers which may be mentioned, in the above-mentioned amounts, are inorganic compounds of phosphoric acid, preference being given to alkaline earth metals and alkali metals. Particularly preference is given to zinc phosphate or zinc dihydrogenphosphate.

Examples of colorants which may be added are inorganic pigments, such as ultramarine blue, iron oxide, zinc sulfide, titanium dioxide, or carbon black, and also organic pigments, such as phthalocyanines, quinacridones, perylenes, and also dyes, such as anthraquinones.

Nucleating agents which may be used are sodium phenylphosphinate, aluminum oxide, silicon dioxide and preferably talc.

Other lubricants and mold-release agents, which are usually used in amounts of up to 1% by weight, are preferably long-chain fatty acids (e.g. stearic acid or behenic acid), salts of these (e.g. Ca stearate or Zn stearate) or montan waxes (mixtures of straight-chain saturated carboxylic acids with chain lengths of from 28 to 32 carbon atoms), or salts of these with alkali metals or with alkaline earth metals, preferably Ca montanate and/or sodium montanate, and also low-molecular-weight polyethylene waxes or low-molecular-weight polypropylene waxes.

Examples of plasticizers which should be mentioned are dioctyl phthalate, dibenzyl phthalate, butyl benzyl phthalate, hydrocarbon oils and N-(n-butyl)benzenesulfonamide.

The thermoplastic molding compositions of the invention may be prepared by processes known per se, by mixing the starting components in conventional mixing apparatus, such as screw extruders, Brabender mixers, or Banbury mixers, and then extruding them. The extrudate may be cooled and comminuted. It is also possible to premix individual components and then to add the remaining starting materials individually and/or likewise mixed. The mixing temperatures are generally from 230 to 290° C.

In one preferred procedure, components B) to F) may be mixed with a polyester prepolymer, compounded, and pelletized. The resultant pellets are then condensed in the solid phase under an inert gas, continuously or batchwise, at a temperature below the melting point of component A), until the desired viscosity has been reached.

In one particularly preferred embodiment, components polyamide C) and nigrosine D) are processed to give a masterbatch (concentrate), the nigrosine content here preferably being from 10 to 60% by weight, in particular from 30 to 45% by weight. The masterbatch made from C) and D) is then mixed and compounded with the other components of the molding composition.

The molding compositions of the invention have improved processability (in particular flowability), and good surface gloss and surface finish, in particular in the case of thin-walled components. In addition, there is an improvement in flame retardancy.

They are suitable for producing fibers, films, or moldings, in particular for applications in the electrical or electronics sector. These applications are in particulur lamp parts, such as lamp sockets and lamp holders, plugs and multipoint connectors, coil formers, casings for capacitors or contacts, and circuit breakers, relay housings, reflectors, cooling-fan wheels, PC components, and power pack casings, coil housings, coil supports, capacitor cups, plug bridges, chip carriers, printed circuitboards, starter housings, transformer housings, battery housings, housings for cooling-fan wheels, protective coverings for lamps, lamp supports, light switches, small electrical devices, housing for a clothes irons, switching systems, chargers, plug sockets, components of motors, components of generators, and terminal strips.

EXAMPLES

Component A$_1$: Polybutylene terephthalate (PBT) with a viscosity number of 130 ml/g and with carboxy end group content of 25 mval/kg (VN measured in 0.5% strength by weight solution made from phenol/o-dichlorobenzene, 1:1 mixture, at 35° C. to ISO 1628), comprising 0.65% by weight, based on $A_1$, of pentaerythritol tetrastearate (component F1).

Component $A_2$: PBT with a VN of 107 ml/g (without component F1)

Component $b_1$: Tetrabromobisphenol A oligocarbonate n~4–5 (BC 52/58 from Great Lakes) Mn~2500

Component $b_2$: Antimony trioxide (as concentrate in polyethylene, 90% strength)

Component C and D:

Concentrate (masterbatch) made from: 60% by weight of a nylon-6,6/6 (90:10) copolyamide VN: 140 ml/g and 40% by weight of nigrosine (Farbbase SAPL)

Component E: PTFE/SAN (50:50) Blendex® 449 from General Electric Plastics

Component F2: Cut glass fibers with average length 4 mm (epoxysilanized size)

Component F3: Carbon black masterbatch made from 60% by weight polyethylene and 40% by weight of carbon black, Raven P-3 from Columbian Chemicals Comp. (Lufilen/Euthylen black)

Preparation of molding compositions

Components A) to F), in the quantitative proportions given in the table, were mixed at 260° C. in an extruder, homogenized, pelletized, and dried.

Flowability was measured using a spiral flow test at 260 or 270° C. melt temperature and 60 or 80° C. mold temperature. The hold pressure was 1000 bar.

Flame retardancy properties were measured to UL 94 on ¹⁄₃₂ inch specimens (0.8 mm) and classified to UL 94.

Melt indices were determined by measuring MVR at 275° C. or 250° C. and 2.16 kg.

The makeup of the molding compositions and the results of the easurements are found in the table.

TABLE 1

| Makeup [% by weight] | Example | | | | |
|---|---|---|---|---|---|
| | 1c | 1 | 2 | 3 | 2c |
| $a_1$ | 49.82 | 49.6 | — | — | — |
| $a_2$ | — | — | 50.3 | 50.8 | 50.8 |
| $b_1$ | 12 | 12 | 11.8 | 11.8 | 12.5 |
| $b_2$ | 5.5 | 5.5 | 5.5 | 5.5 | 5.5 |
| C + D | — | 1 | 1.5 | 1 | — |
| E | 0.4 | 0.4 | 0.4 | 0.4 | 0.4 |
| F1 | 1 | 1 | 0.5 | 0.5 | 0.8 |
| F2 | 30 | 30 | 30 | 30 | 30 |
| F3 | 1.28 | 0.5 | — | — | — |
| Flow spiral 2 mm 260° C./80° C. [cm] | 36 | 43 | 55 | 49 | 27.7 |
| 270° C./80° C. [cm] | 42.5 | 60.5 | 72 | 60.5 | — |
| UL 94 [0.8 mm] | V-2 | V-0 | V-0 | V-0 | V-2 |
| Gloss - visual perception | low | very high | very high | very high | moderate |
| MVR (250° C./2.16 kg) [ml/10 min] | — | — | 25.4 | 20.1 | 11.2 |
| (275° C./2.16 kg) [ml/10 min] | 28.2 | 68 | 81.3 | 72.0 | 23.1 |

TABLE 2

| Makeup [% by weight] | Example | | |
|---|---|---|---|
| | 4 | 5 | 6*⁾ |
| $a_1$ | 49.3 | 49.6 | 50 |
| $a_2$ | — | — | — |
| $b_1$ | 12.5 | 12.2 | 12.2 |
| $b_2$ | 5.5 | 5.5 | 5.5 |
| C + D | 1 | 1 | 1 |
| E | 0.4 | 0.4 | 0.4 |

TABLE 2-continued

| Makeup [% by weight] | Example | | |
|---|---|---|---|
| | 4 | 5 | 6*⁾ |
| F1 | 0.8 | 0.8 | 0.8 |
| F2 | 30 | 30 | 30 |
| F3 | 0.5 | 0.5 | — |
| Flow spiral 2 mm | | | |
| 260° C./80° C. [cm] | 41.5 | 42.5 | 42.75 |
| 270° C./80° C. [cm] | — | — | — |
| UL 94 [0.8 mm] | V-0 | V-0 | V-0 |
| Gloss - visual perception | very high | very high | very high |
| MUR | | | |
| (250° C./2.16 kg) [ml/10 min] | 22.9 | 25.8 | 27.2 |
| (275° C./2.16 kg) [ml/10 min] | 77.2 | 85.5 | 86.75 |

*⁾comprising 0.1% by weight of talc

I claim:

1. A thermoplastic molding composition comprising
   A) from 10 to 97% by weight of at least one thermoplastic polyester,
   B) from 1 to 30% by weight of a flame retardant combination made from, based on 100% by weight of B),
      $b_1$) from 20 to 99% by weight of a halogen-containing flame retardant, and
      $b_2$) from 1 to 80% by weight of an antimony oxide,
   C) from 0.01 to 3% by weight of at least one polyamide,
   D) from 0.01 to 2% by weight of at least one nigrosine,
   F) from 0.01 to 3% by weight of an antidrip agent, and
   F) from 0 to 70% by weight of other additives,
   where the total of the percentages by weight of the components A) to F) is 100%.

2. A thermoplastic molding composition as claimed in claim 1, in which component A is composed of a polyalkylene terephthalate having from 2 to 10 carbon atoms in the alcohol moiety.

3. A thermoplastic molding composition as claimed in claim 1, comprising from 1 to 50% by weight of a fibrous or particulate filler F) or a mixture of these.

4. A thermoplastic molding composition as claimed in claim 1, in which $b_2$) is composed of antimony trioxide or of antimony pentoxide, or a mixture of these.

5. A thermoplastic molding composition as claimed in claim 1, in which component C) is an aliphatic polyamide.

6. A thermoplastic molding composition as claimed in claim 1, in which component C) is a nylon-6/6,6 copolyamide.

7. A thermoplastic molding composition as claimed in claim 1, in which components C) and D) are in the form of a previously mixed masterbatch (concentrate), and then are mixed with components A, B, E, and also, optionally, F).

8. A thermoplastic molding composition as claimed in claim 1, in which component E) is composed of a polymer of ethylene with a fluorine content of from 55 to 76% by weight, based on E).

9. A molding obtainable from the thermoplastic molding compositions as claimed in claim 1.

10. A coil housing, a coil former, a coil support, a capacitor cup, a plug connector, a multipoint connector, a plug bridge, a chip carrier, a printed circuitboard, a lamp part, a lamp holder, a starter housing, a transformer housing, a battery housing, a cooling-fan wheel, a housing for cooling-fan wheels, a lamp socket, a protective covering for lamps, a lamp support, a light switch, a small electrical device, a housing for a clothes iron, a switching system, a circuit breaker, a charger, a plug socket, a component of a motor, a component of a generator, or a terminal strip obtainable from the thermoplastic molding compositions as claimed in claim 1.

11. The composition of claim 1 wherein said other additives is selected from the group consisting of elastomeric polymers, fibrous or particulate fillers, stabilizers, oxidation retarders, thermal decomposition stabilizers, UV stabilizers, lubricants, mold release agents, colorants, nucleating agents, plasticizers and mixtures thereof.

* * * * *